UNITED STATES PATENT OFFICE.

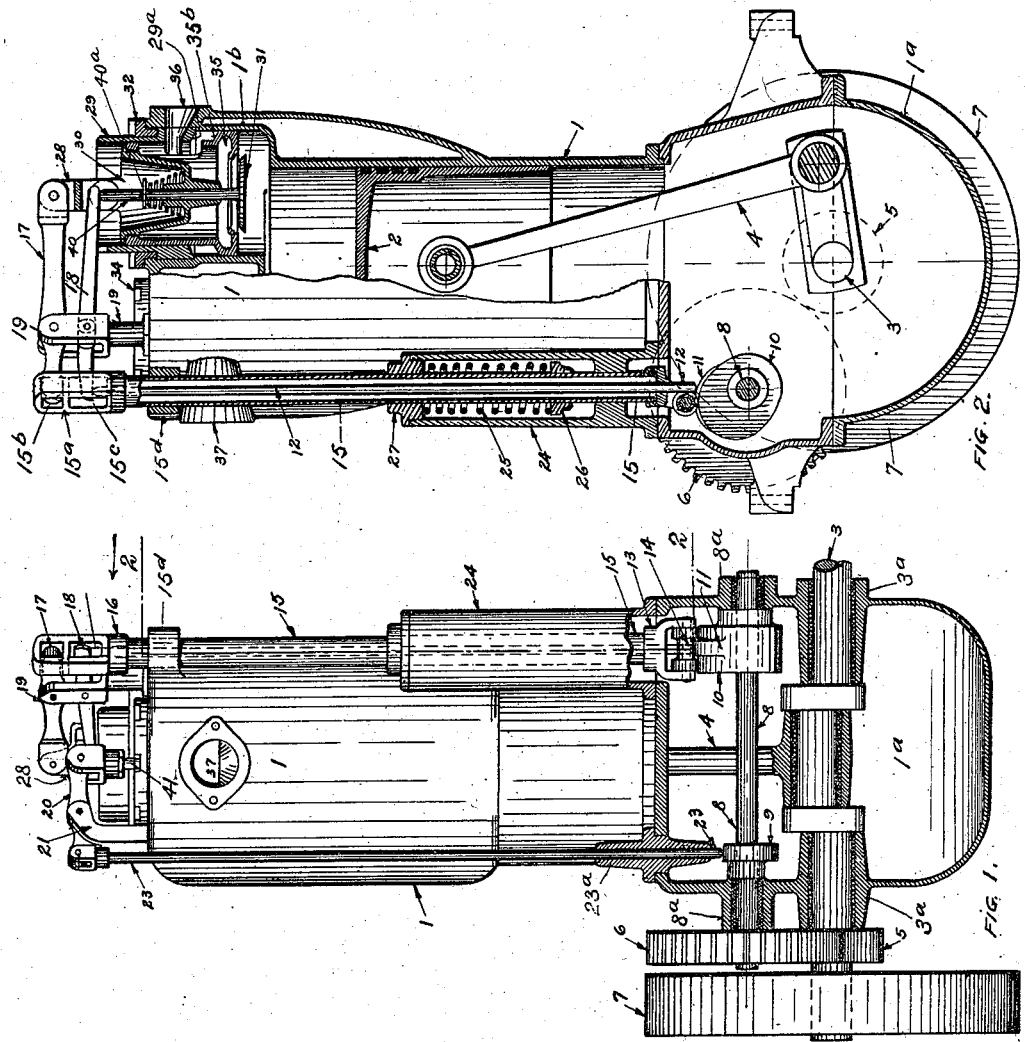

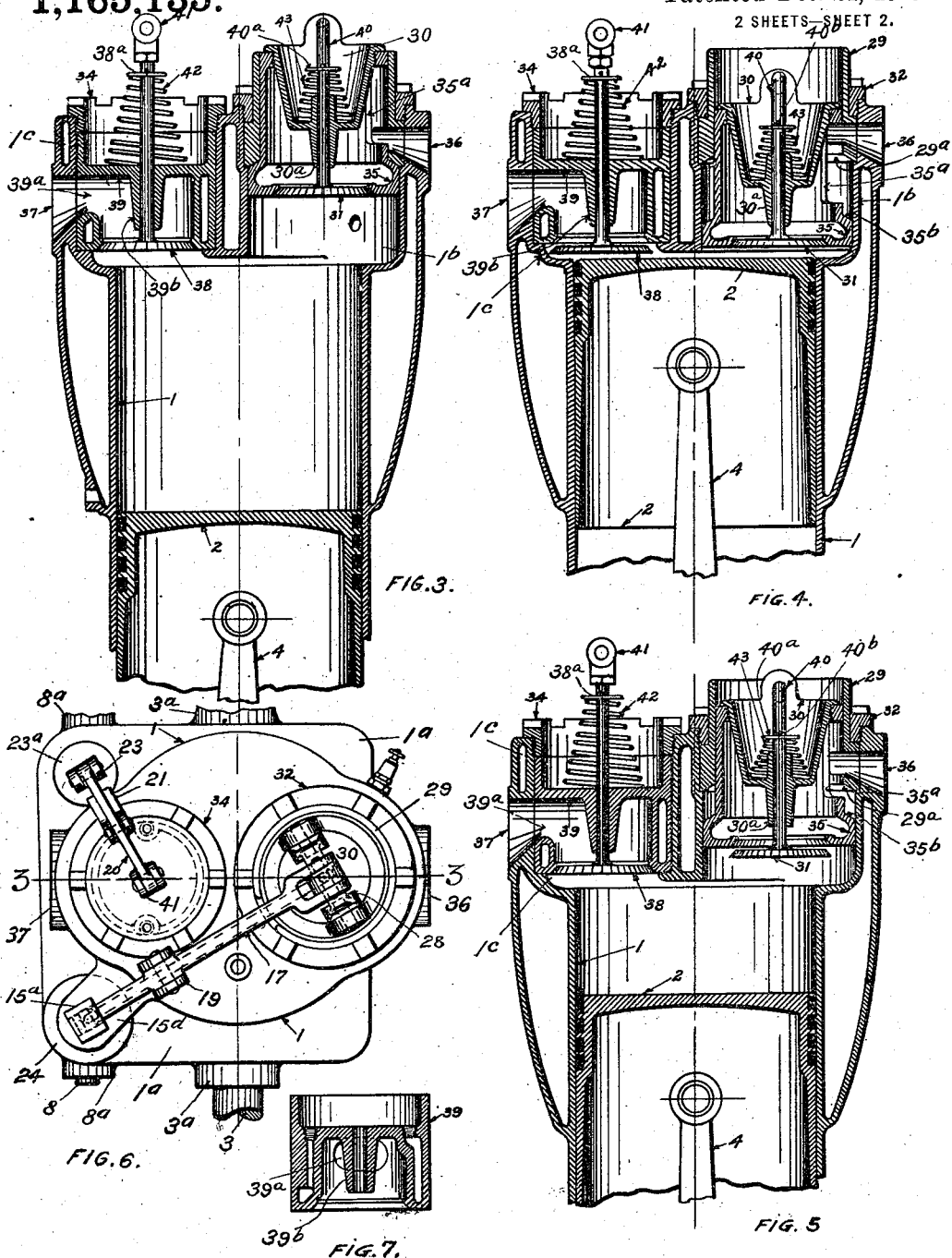

FREDERICK A. SEITZ, OF NEWARK, NEW JERSEY.

INTERNAL-COMBUSTION ENGINE.

1,165,135. Specification of Letters Patent. Patented Dec. 21, 1915.

Application filed May 1, 1912. Serial No. 694,427.

*To all whom it may concern:*

Be it known that I, FREDERICK A. SEITZ, a citizen of the United States, residing at Newark, Essex county, in the State of New Jersey, have invented certain new and useful Improvements in Internal-Combustion Engines, of which the following is a full, clear, and exact specification.

My invention relates to improvements in internal combustion engines, and the same has for its object more particularly to provide a simple, efficient and reliable engine by means of which a higher efficiency, and a greater degree of perfection in operation may be obtained.

Further said invention has for its object to provide an engine in which the cubical area of the compression chamber may be automatically increased during the compression and firing period.

Further said invention has for its object to provide an engine in which the space between the inner end of the piston and the end of the cylinder adjacent thereto may be reduced to the smallest extent possible in order to insure the more effectual discharge of the burnt gases from the cylinder after each explosion.

Further said invention has for its object to provide an engine in which the cubical area of the cylinder may be automatically increased during the intake, compression and firing periods, and then automatically reduced during the exhaust period.

Further said invention has for its object to provide an engine in which the means for changing the cubical area of the cylinder, and also the valve means controlling the intake and exhaust ports may be positively and regularly operated.

To the attainment of the aforesaid objects and ends my invention consists in the novel details of construction, and in the combination, connection and arrangement of parts hereinafter more fully described, and then pointed out in the claims.

In the accompanying drawings forming part of the specification wherein like numerals of reference indicate like parts, Figure 1, is a side view, partly broken away, and in section showing one form of engine constructed according to, and embodying my said invention: Fig. 2, is an end view partly in section on the line 2—2 of Fig. 1, looking in the direction of the arrow; Fig. 3, is an enlarged detail vertical section taken on the line 3—3 of Fig. 6, showing the upper portion of the cylinder and the position of the valves and the piston at the beginning of the compression stroke; Fig. 4, is a similar view showing the position of the same parts at about the completion of the exhaust movement of the piston, and just before the exhaust valve is closed; Fig. 5, is a further view showing the position of the same parts with the piston having moved outward about half way during the suction or intake stroke; Fig. 6 is a detail top view of the cylinder showing the relative position of the valve operating means, and Fig. 7 is a detail central, vertical section showing the construction of the exhaust valve casing.

In said drawings the engine is shown composed of a cylinder 1, to the lower end of which is secured a crank case $1^a$.

2 designates the usual piston working within the cylinder 1, and having connected thereto the upper end of a rod 4 which is connected at its lower end to the crank shaft 3 supported in bearings $3^a$, $3^a$, provided in the crank case. Upon one of the projecting ends of the crank shaft 3 is fixed a fly wheel 7, and intermediate said fly wheel 7 and the crank case $1^a$ is fixed a pinion 5, which meshes with a large gear 6 fixed upon a shaft 8 arranged slightly above, and to one side of the crank shaft 3.

$8^a$, $8^a$ denote bearings provided in the crank case $1^a$ in which are supported the opposite ends of the shaft 8.

A cam 9 is fixed upon the shaft 8 within the crank case $1^a$, adjacent to the gear 6, and adjacent to the opposite end of said shaft, but also within the crank case $1^a$, is fixed a large cam 10, having a cam projection 11 arranged thereon.

At one side of the cylinder 1 is provided a vertical, cylindrical casing 24 within which works the lower end of a tubular rod 15 having its upper end guided in a bearing $15^d$ provided upon the outer side of the cylinder 1 adjacent to the upper end thereof. At the upper end of said tubular rod 15 is provided a solid portion $15^a$, having a small transverse opening $15^b$ therein, and below said opening $15^b$ a second large transverse opening $15^c$, and at the lower end of said tubular rod 15 is mounted a double roller 14 whose ends are adapted to ride upon the cam 10 at each side of the cam projection 11. The portion of the roller 14 intermediate its ends is of smaller diameter than its ends so that it may pass over the cam projection 11 provided upon the periphery of the cam 10.

Within the tubular rod 15 is arranged a rod 12 which has its upper and lower ends guided in openings provided in the upper and lower ends of said tubular rod 15. The upper end of said rod 12 extends into the transverse opening 15ᶜ in the head 15ᵃ on said tubular rod 15, while the lower end of said rod 12 is adapted to ride upon the portion of the cam intermediate the ends of the roller 14, and to be actuated by the cam projection 11 on the periphery of said cam 10.

The upper end of the cylinder 1 is extended to form a secondary cylinder 1ᵇ, which communicates normally with the intake port 36 of the engine. Within said secondary cylinder works a hollow piston 35 which as a whole also acts as a valve at certain periods during the operation of the engine. The hollow piston 35 is provided in one side with an elongated vertical opening 35ᵃ which is in constant communication with the intake port 36.

The hollow piston 35 is provided upon its outer surface, at its lower end, with an enlarged portion having an inclined upper edge 35ᵇ, forming a valve face which is adapted to seat upon the inclined lower end 29ᵃ of a sleeve 29 which is secured in the open upper end of the secondary cylinder 1ᵇ by a nut 32.

Within the upper end of the hollow piston 35 is secured a socketed cap 30, having a central bearing 30ᵃ at its base, in which is disposed a valve stem 40 having a valve 31 secured upon its lower end adapted to seat upon a valve seat provided in the bottom of the hollow piston 35. The said valve 31 is maintained normally closed by a spring 43 partly surrounding the bearing 30ᵃ and the valve stem 40. The said spring 43 has its lower end bearing upon the base of the socketed cap 30, and its upper end bearing against a washer 40ᵃ, restrained by a pin 40ᵇ passing through the valve stem 40.

Upon the top of the cylinder 1 is secured a double bifurcated bearing 19 in which is mounted a lever 17, and directly below said lever 17 is mounted a second lever 18. The lower lever 18 has one end extending into the lower transverse opening 15ᶜ in the upper end of the tubular rod 15, and engaging the upper end of the rod 12, and its other end engaging the end of the valve stem 40, in the hollow piston 35. The upper lever 17 has one end pivotally connected to a yoke 28 secured to the upper end of the hollow valve 35, and its other end extended into the upper transverse opening 15ᵃ provided in the upper end of the hollow rod 15.

In the upper end of the cylinder 1, adjoining the secondary cylinder 1ᵇ, is provided a smaller cylinder 1ᶜ, within which is fitted a cylindrical, water-jacketed valve casing 39. The said valve casing is secured in position within said cylinder 1ᶜ by a nut 34. The said valve casing 39 is provided at one side with an opening 39ᵃ communicating with the exhaust port 37 of the engine, and at its base said valve is provided with a valve seat.

39ᵇ denotes a central bearing provided in said valve casing 39 through which passes a valve stem 41 carrying a valve 38 at its lower end. The valve 38 is maintained normally closed by a spring 42 arranged upon the stem 41 intermediate the top of said valve casing and a stop 38ᵃ on the valve stem 41.

21 denotes a bearing provided upon the top of the cylinder 1 in which is pivotally mounted a lever 20 having one end connected to the upper end of the exhaust valve stem 41, and its other end connected to the upper end of a rod 23 guided in a bearing 23ᵃ, on the crank case 1ᵃ. The lower end of said rod extends into said crank case, and bears upon the cam 9, fixed upon the shaft 8.

The operation is as follows: With the first downward movement or intake stroke of the main piston 2, the hollow piston 35 will be raised to its upper or retracted position by action of the cam 10, tubular rod 15, and lever 17, (see Fig. 3). During the same time the inlet valve 31 in the hollow piston 35 will be opened by the action of the cam projection 11 on the cam 10 engaging the rod 12, and actuating the lever 18 and valve stem 40, on said inlet valve 31, (see Fig. 5). The explosive charge is thereupon received through the intake 36, opening 35ᵃ, hollow piston 35, and into the cylinder 1. During this period the exhaust valve 38 is maintained closed.

With the first upward movement or compression stroke of the piston 2, the cam 10 permits the tubular rod 15 to descend, and the inlet valve 31 in the hollow piston 35 to close under the influence of the spring 43. The hollow piston 35 remains in its upper or retracted position, and the inlet valve 31 remains in its closed position during the next downward movement or exploding stroke of the piston 2 (see Fig. 3). With the next upward movement, or exhaust stroke of the piston 2, the exhaust valve 38 will be opened by the cam 9, raising the rod 23, actuating the lever 20, and depressing the valve stem 41 (see Fig. 4). At the same time that the exhaust valve 38 is opened, the cam 10 will raise the tubular rod 15, actuate the lever 17, and cause the hollow piston 35 to descend to its advanced or lowermost position without opening the inlet valve 31 therein. By this action all burnt gases remaining in the secondary cylinder 1ᵇ will be forced by the hollow piston 35 into the main cylinder, and thence ejected from the latter by the main piston 2 through the exhaust valve 38. As soon as the main piston 2 has completed its exhaust stroke, the cam 9 and related parts will permit the exhaust valve 38 to close, and the cams 10 and 11 and their related parts will cause the hollow piston 35 and its associated parts to be restored to their initial positions as shown in Fig. 3.

The operations above described will thereafter be repeated in the sequence stated.

Having thus described my said invention, what I claim, and desire to secure by Letters Patent, is:

1. In an internal combustion engine, the combination with a main cylinder having a reduced portion extended beyond the normal outline thereof and communicating with the intake port, a piston working in said main cylinder, a piston working in the reduced portion of said cylinder, a valve in the piston of said reduced portion, means for operating the piston in said reduced portion whereby to vary the cubical area of the compression chamber, and means for operating the valve in said piston to control the supply of explosive mixture to said cylinder, substantially as specified.

2. In an internal combustion engine, the combination of a main cylinder and piston working therein, a secondary cylinder communicating with the intake port, and with said main cylinder, a piston working in said secondary cylinder, a valve arranged in said last-named piston, means for operating said valve to control the admission of explosive mixture to said main cylinder, and means for retracting said piston in said secondary cylinder during the compression and firing periods, substantially as specified.

3. In an internal combustion engine, the combination of a main cylinder and piston working therein, with a secondary cylinder communicating with the intake and connected to and communicating with the closed end of said main cylinder, a piston working in said secondary cylinder, a valve in said piston, means for opening said valve during the intake period, a means for closing said valve and retracting the piston in said secondary cylinder and maintaining the same in its retracted position during the compression and firing periods, and advancing said piston to close said secondary cylinder during the exhaust period, substantially as specified.

4. In an internal combustion engine, the combination of a main cylinder and piston working therein, with a secondary cylinder communicating with the closed end of said main cylinder, a hollow piston working in said secondary cylinder and communicating with the intake of the engine, a normally closed valve arranged in said hollow piston, means for retracting said hollow piston in said secondary cylinder, means for opening the valve in said hollow piston during the intake period, means for maintaining said hollow piston in its retracted position during the compression and firing periods, and means for advancing said hollow piston to close said secondary cylinder during the exhaust period, substantially as specified.

5. In an internal combustion engine, the combination of a main cylinder and piston working therein, with a secondary cylinder communicating with said main cylinder, a hollow piston working in said secondary cylinder having an opening therein in constant communication with the intake of the engine, an inlet in said hollow piston, a valve normally sealing the inlet in said hollow piston during the compression and firing periods, and means for retracting said hollow piston and opening the inlet valve therein during the intake period, substantially as specified.

6. In an internal combustion engine, the combination of a main cylinder and a piston working therein, with a secondary cylinder communicating with said main cylinder, a hollow piston working in said secondary cylinder having an opening therein in constant communication with the intake of the engine, an inlet valve in said hollow piston, means for advancing said hollow piston and closing said valve during the exhaust period, substantially as specified.

7. In an internal combustion engine, the combination of a main cylinder and piston working therein, with a secondary cylinder communicating with the closed end of said cylinder, a hollow piston working in said secondary cylinder having an opening therein in constant communication with the intake of the engine, a normally closed inlet valve in said hollow piston, a lever connected to said hollow piston, a shaft operated from the crank shaft, a cam on said driven shaft, a rod having one end in engagement with said cam, and its other end in engagement with the lever connected to said hollow piston, whereby to actuate said hollow piston, a second lever having one end in engagement with the inlet valve in said hollow piston, and a rod having one end engaging a part of the cam aforesaid, and its other end in engagement with the other end of said last-named lever, whereby to actuate said inlet valve, substantially as specified.

8. In an internal combustion engine, the combination of a main cylinder and piston working therein, with a secondary cylinder communicating with the closed end of said main cylinder, a hollow piston working in said secondary cylinder having an opening therein in constant communication with the intake of the engine, a normally closed inlet valve in said hollow piston, a lever connected to said hollow piston, a shaft operated from the crank shaft, a cam on said driven shaft, a rod having one end in engagement with said cam, and its other end in engagement with the lever connected to said hollow piston, whereby to actuate said hollow piston, a second lever having one end in engagement with the inlet valve in said hollow piston, a rod having one end engaging a part of the cam aforesaid, and its other end in engagement with the other end of said first-named lever, a cylinder also communicating with said main cylinder, a normally closed valve therein communicating with the exhaust of the engine, a lever for operating said exhaust valve, a rod connected to said lever, and a cam on said driven shaft for actuating said rod, substantially as specified.

9. In an integral combustion engine, the combination of a main cylinder and piston working therein, with a pair of supplemental cylinders communicating with said main cylinder, and one of said supplemental cylinders having an intake port, and the other an exhaust port, a hollow piston in one of said cylinders communicating with the intake port, a normally closed inlet valve in said hollow piston, a valve casing secured in the other of said cylinders and communicating with the exhaust port therein, a normally closed valve in said casing, a pair of levers pivotally mounted upon the main cylinder, one of said levers being connected to said hollow piston, and the other engaging the inlet valve therein, a bearing mounted on said main cylinder, a lever pivotally mounted thereon and connected to said exhaust valve, a crank shaft, a shaft driven by said crank shaft, cam means on said driven shaft, and rods having their lower ends engaged by said cams, and their upper ends connected to the levers for operating said hollow piston, the inlet valve therein, and said exhaust valve, substantially as specified.

Signed at the city of New York, in the county and State of New York, this 29th day of April, 1912.

FREDERICK A. SEITZ.

Witnesses:
CONRAD A. DIETEND,
JOSEPH G. QUINN, Jr.

Copies of this patent may be obtained for five cents each, by addressing the "Commissioner of Patents, Washington, D. C."